US006986485B2

(12) United States Patent
Farnsworth

(10) Patent No.: US 6,986,485 B2
(45) Date of Patent: Jan. 17, 2006

(54) OVERHEAD SPACE ACCESS STOWABLE STAIRCASE

(75) Inventor: Jeffrey D. Farnsworth, Marysville, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/708,733

(22) Filed: Mar. 22, 2004

(65) Prior Publication Data
US 2005/0230542 A1   Oct. 20, 2005

(51) Int. Cl.
*E06C 9/00* (2006.01)
*B64D 11/00* (2006.01)

(52) U.S. Cl. ............... 244/118.5; 244/129.6; 182/77

(58) Field of Classification Search ........... 244/118.5, 244/118.6, 118.1, 118.2, 129.6, 119; 182/77, 182/78, 79, 80, 81; B64C 11/00; E06C 9/00
See application file for complete search history.

(56) References Cited

U.S. PATENT DOCUMENTS

| | | | | |
|---|---|---|---|---|
| 936,681 A | * | 10/1909 | Union ........................ | 182/77 |
| 1,439,030 A | * | 12/1922 | Stahl ........................ | 244/129.6 |
| 1,802,401 A | * | 4/1931 | Bessler ........................ | 182/79 |
| 1,811,708 A | * | 6/1931 | Bessler ........................ | 182/78 |
| 1,867,904 A | * | 7/1932 | Bessler ........................ | 182/78 |
| 1,930,992 A | * | 10/1933 | Bessler ........................ | 182/80 |
| 2,455,157 A | * | 11/1948 | Bigelow ................. | 244/129.5 |
| 2,531,263 A | * | 11/1950 | Fink et al. ..................... | 182/97 |
| 2,815,159 A | * | 12/1957 | Harmon ........................ | 182/78 |
| 2,840,289 A | * | 6/1958 | Murray ........................ | 182/77 |
| 2,931,456 A | * | 4/1960 | Harmon ........................ | 182/80 |
| 2,933,149 A | * | 4/1960 | Lee ........................... | 182/78 |
| 2,990,148 A | * | 6/1961 | James ..................... | 244/129.6 |
| 3,144,224 A | * | 8/1964 | Carroll ................... | 244/129.5 |
| 3,842,935 A | * | 10/1974 | Frank ........................ | 182/81 |
| 3,901,353 A | * | 8/1975 | Skolnik ...................... | 182/78 |
| 3,941,337 A | * | 3/1976 | Molter et al. ............ | 244/129.6 |
| 3,985,202 A | * | 10/1976 | Harmon ...................... | 182/79 |
| 4,014,486 A | * | 3/1977 | Nelson et al. ........... | 244/129.6 |
| 4,055,317 A | * | 10/1977 | Greiss ..................... | 244/118.5 |
| 4,066,227 A | * | 1/1978 | Buchsel ................... | 244/118.6 |
| 4,669,574 A | * | 6/1987 | Moutot ....................... | 182/88 |
| 4,742,888 A | * | 5/1988 | Amacker .................... | 182/116 |
| 5,050,706 A | * | 9/1991 | Cole et al. .................... | 182/78 |
| 5,111,906 A | * | 5/1992 | Abadia ....................... | 182/19 |
| 5,115,999 A | * | 5/1992 | Buchsel et al. .......... | 244/118.5 |
| 5,143,324 A | * | 9/1992 | Cornelius et al. ........ | 244/129.6 |
| 5,174,411 A | * | 12/1992 | Oliver et al. ................. | 182/77 |
| 5,299,653 A | * | 4/1994 | Nebel ........................ | 182/2.7 |
| 5,395,075 A | * | 3/1995 | Sprenger et al. ......... | 244/118.5 |
| 5,474,260 A | * | 12/1995 | Schwertfeger et al. ... | 244/118.5 |
| 5,784,836 A | * | 7/1998 | Ehrick ........................ | 52/79.8 |

(Continued)

OTHER PUBLICATIONS www.dictionary.com, p. 1-3.*

*Primary Examiner*—Teri Pham Luu
*Assistant Examiner*—S. A. Holzen
(74) *Attorney, Agent, or Firm*—Artz & Artz, P.C.

(57) ABSTRACT

An overhead area access staircase system (10) for an aircraft (12) includes an aircraft overhead module (20) and multiple stair segments (40). The stair segments (40) are actuated relative to each other when deployed and are configured to be in proximity with the overhead module (20). The stair segments (40) are in contact with the overhead module (20) when deployed. The stair segments (40) include step elements (42) and support members (44) coupled thereto.

28 Claims, 3 Drawing Sheets

U.S. PATENT DOCUMENTS

| | | | |
|---|---|---|---|
| 6,003,813 A * | 12/1999 | Wentland et al. | 244/118.5 |
| 6,152,400 A * | 11/2000 | Sankrithi et al. | 244/118.5 |
| 6,182,926 B1 * | 2/2001 | Moore | 244/118.5 |
| 6,305,645 B1 * | 10/2001 | Moore | 244/118.5 |
| 6,464,169 B1 * | 10/2002 | Johnson et al. | 244/118.5 |
| 6,520,451 B1 * | 2/2003 | Moore | 244/118.5 |
| 6,581,876 B2 * | 6/2003 | Cheung | 244/118.5 |
| 6,659,225 B2 * | 12/2003 | Olliges et al. | 182/97 |
| 6,739,100 B1 * | 5/2004 | Lewandowski | 52/184 |
| 6,866,118 B1 * | 3/2005 | Battenberg | 182/77 |
| 6,886,661 B1 * | 5/2005 | Battenberg | 182/77 |
| 2003/0019976 A1 * | 1/2003 | Cheung | 244/118.5 |
| 2005/0029042 A1 * | 2/2005 | Latimer et al. | 182/77 |
| 2005/0029044 A1 * | 2/2005 | Latimer et al. | 182/78 |

* cited by examiner

OVERHEAD SPACE ACCESS STOWABLE STAIRCASE

BACKGROUND OF INVENTION

The present invention is related generally to staircase systems. More particularly, the present invention is related to stowable staircase systems that enable access to various areas of an aircraft.

Space within a crown of a wide body aircraft is typically not efficiently or fully utilized, due to the difficulty in access thereof. In order to maximize storage and seating area within a commercial passenger aircraft, efficient use of space within the aircraft is desired. Efficient use of aircraft space can increase the number of passengers transported per flight and the capability of an aircraft to store more items on board.

Increased efficiency of space usage not only increases physical capacity of an aircraft, but can also increase customer and crewmember satisfaction and revenue per flight. For example, and particularly with respect to long flights, additional space allows for increased storage of food, baggages, and other items of various sizes. Improved efficiency of space usage also provides increased space for passenger and crewmember seating, rest areas, and movement about the aircraft.

In larger aircraft that are typically used for longer flights, overhead space modules, such as crew rest stations and additional storage compartments, are provided in the space between the curved top portion of the hull of the aircraft and the lowered ceiling of the aircraft. These overhead space modules are not easily accessible, and most often are accessed through a narrow stairway. This overhead space can be limited in size and provides limited access and movement. In present commercial passenger aircrafts, not only are certain overhead areas for use by crewmembers inconvenient and difficult to access, but also storage in general and areas allotted for crewmembers are limited.

Also, typical mechanisms for accessing overhead areas result in loss of both overhead space and main deck space. Traditional style staircases, whether permanent or deployable, tend to have a large stowed and deployed envelope, which reduces the available overhead and main deck spaces. Staircase systems that are more permanent in design utilize main deck space continuously as opposed to deployable staircase systems, which occupy main deck space when deployed. Thus, overhead space usage, including crew rest areas, has been limited to single functions and to commodities that do not require use of an access system or monument. Access monuments are generally needed when storing large or heavy items in an overhead area.

Thus, there exists a need for an improved space efficient staircase mechanism for access to overhead areas of an aircraft that utilizes a minimal amount of space in both a stowed and/or deployed arrangement, that is cost effective to manufacture and implement within an aircraft, that is lightweight, and that is easy and convenient to utilize and operate.

SUMMARY OF INVENTION

The present invention provides an overhead area access staircase system for an aircraft that includes an aircraft overhead module and multiple stair segments. The stair segments are actuated relative to each other when deployed and are configured to be in proximity with the overhead module. The stair segments are in contact with the overhead module when deployed. The stair segments include step elements and support members coupled thereto.

The embodiments of the present invention provide several advantages. One such advantage is the provision of an overhead area access staircase system that has both a compact stowed state and a space efficient deployed state.

An advantage provided by multiple embodiments of the present invention is the provision of staircases that can be stowed within an overhead module.

Another advantage provided by an embodiment of the present invention is the provision of an overhead area access staircase system that incorporates potential energy devices and/or other devices that aid in the stowage and deployment of the staircase system.

Yet another advantage that is provided by an embodiment of the present invention is the provision of an overhead area access staircase system that incorporates the use of deployable handrails. The deployable handrails aid in the ascending and descending of the staircase system and provide a compact arrangement when stowed.

The embodiments of the present invention also provide various devices and mechanisms for transitioning overhead area access staircase systems between stowed states and deployed states.

The present invention itself, together with further objects and attendant advantages, will be best understood by reference to the following detailed description, taken in conjunction with the accompanying drawing.

DETAILED DESCRIPTION

Figure 1:
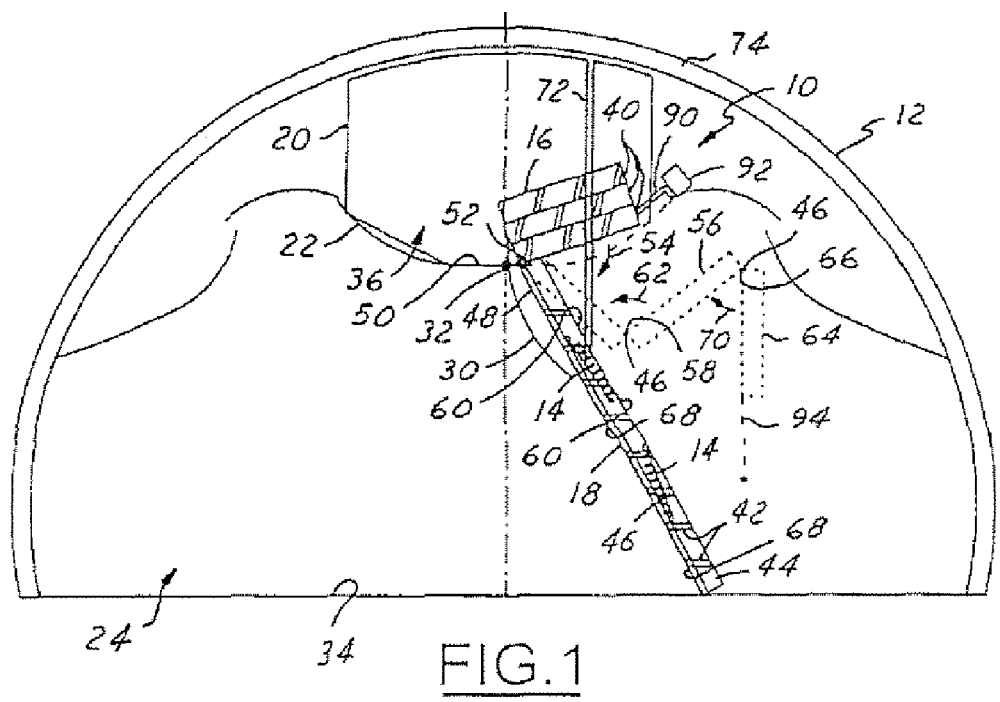
FIG. 1 is a side view of an overhead area access staircase system for an aircraft incorporating potential energy devices in accordance with an embodiment of the present invention.

In the following Figures the same reference numerals will be used to refer to the same components. While the present invention is described primarily with respect to overhead area access staircase systems for use within an aircraft, the present invention may be adapted and applied in various vehicle and non-vehicle applications. The present invention may be applied in aeronautical applications, nautical applications, railway applications, automotive vehicle applications, commercial and residential applications, as well as in other applications known in the art where space is limited and efficient use thereof is desired. Also, the staircase systems of the present invention may be utilized to access overhead areas, to access rest areas, to access various service areas, to ascend or descend between floors, or for other purposes known in the art.

In the following description, various operating parameters and components are described for one constructed embodiment. These specific parameters and components are included as examples and are not meant to be limiting.

In the following FIGS. 1–4, several staircase systems are shown. The staircase systems of FIGS. 1–4 are shown in three states, a stowed state, a transition state, and a deployed state. The transition state represents transition of the staircase systems between the stowed state and the deployed state. The transition state is shown in hidden line format.

Referring now to FIG. 1, a side view of a first overhead area access staircase system 10 for an aircraft 12 incorporating potential energy devices 14 in accordance with an embodiment of the present invention is shown. The staircase system 10 has a stowed state 16 and a deployed state 18. The staircase system 10 includes, is coupled to, and is stowable within an aircraft overhead module 20. Due to the folded stowed envelope and the lean deployed envelope of the staircase system 10, the staircase system 10 provides efficient use of the spaces above the ceiling 22 and within the main deck area 24 when in both the stowed state 16 and the deployed state 18.

In operation, an access door 30 of the overhead module 20 is opened, by rotation thereof on an access door hinge 32. The staircase system 10 may then be released. The staircase system 10 is unfolded to rest upon the floor 34. A passenger or crewmember may then ascend and interact with or access the overhead area 36. The staircase system 10 may be located in various areas throughout the aircraft 12. The staircase system 10 may be utilized to access overhead areas, including accessing storage areas, crew rest areas, and other overhead areas. The staircase system 10 may also be used to ascend to and descend from floors of the aircraft 12.

The overhead module 20 may be in the form of a passenger or crewmember storage bin, a crew rest module, or other overhead module known in the art. The overhead module 20 may be of various sizes, types, and styles and have various access panels or doors.

The staircase system 10 also includes multiple stair segments 40. Each stair segment 40 has step elements 42 and support members 44. The step elements 42 are coupled between the support members 44. The support members 44 extend between the overhead module 20 and the floor 34 and provide support for the step elements 42. Although three stair segments are shown, any number of stair segments may be utilized. The stair segments 40 may be formed of various lightweight materials known in the art, such as aluminum, steel, wood, a composite material, plastic, or a combination thereof.

The stair segments 40 may be coupled to each other via stair segment hinges 46, as shown. In the example embodiment shown, a first stair segment 48 is coupled to a lining or sidewall 50, or support structure of the overhead module 20 via a first stair segment hinge 52. The stair segments 40 rotate out from the overhead module 20 and into the main deck area 24 on the first hinge 52, which is represented by arrow 54. The first stair segment 48 is coupled to a second stair segment 56 via a second stair segment hinge 58. The second hinge 58 is coupled to the front sides 60 of the stair segments 48 and 56 such that the second segment 56 rotates and folds onto the first segment 48, the transition thereof is represented by arrow 62. The second stair segment 56 is coupled to the third stair segment 64 via a third stair segment hinge 66. The third hinge 66 is coupled to the back sides 68 of the segments 56 and 64 such that the third segment 64 rotates and folds onto the second segment 56, the transition thereof is represented by arrow 70.

The potential energy devices 14 assist in the transition of the staircase system 10 between the stowed state 16 and the deployed state 18. The potential energy devices 14 may be coupled to the support members 44, as shown, or may be incorporated using some other technique known in the art. The staircase system 10 may include any number of potential energy devices. Although the potential energy devices 14 are shown as springs, they may be in various forms.

Figure 3:
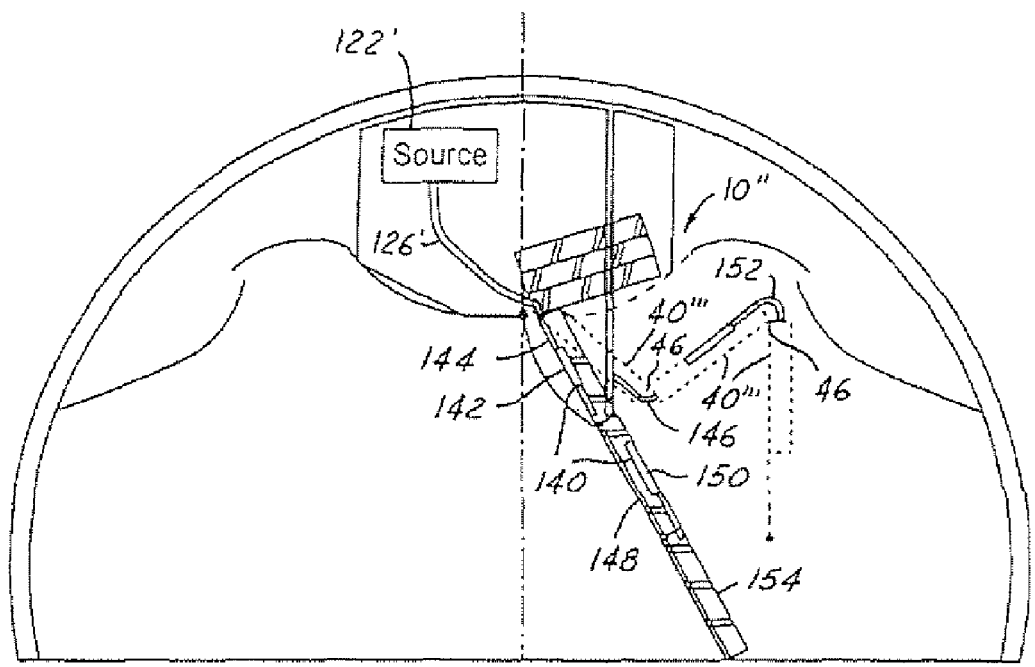
FIG. 3 is a side view of an overhead area access staircase system incorporating hydraulically assisted stair segments in accordance with another embodiment of the present invention.

The staircase system 10 may also include one or more lanyards 72 (only one is shown). The lanyards 72 are coupled to the overhead module 20 or to an aircraft structure, such as structure 74 to support the stair segments 40. The lanyards 72 may be directly coupled to the overhead module 20, as shown in FIG. 1, or may be coupled indirectly as shown in FIG. 3. The lanyards 72 may be in the form of potential energy devices to assist in the stowage or deployment of the stair segments 40. The lanyards 72 may be of various types and styles. The lanyards 72 may be in the form of cables, ropes, straps, springs, or may be of some other form known in the art.

Figure 4:
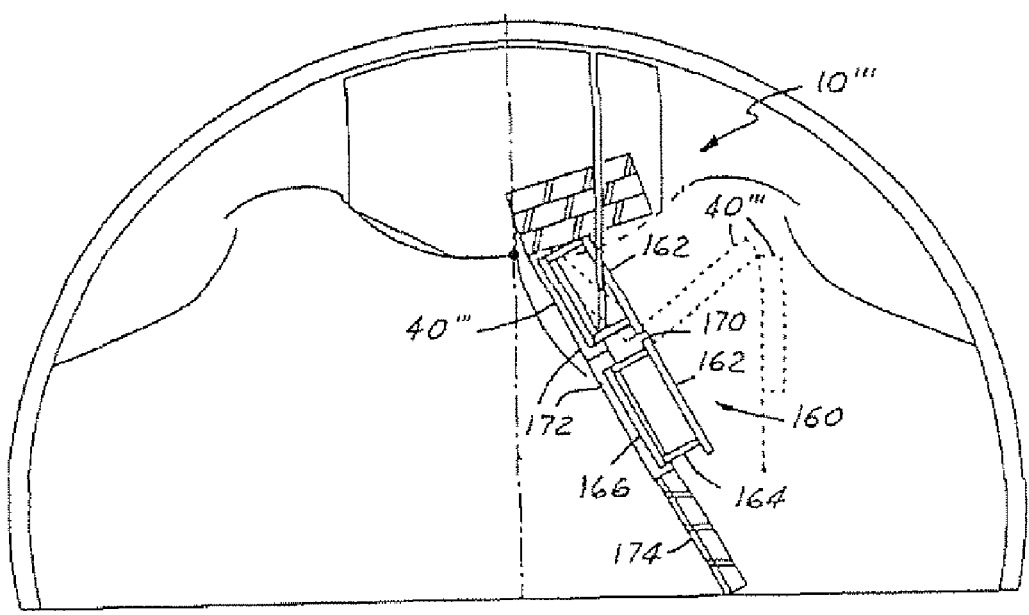
FIG. 4 is a side view of an overhead area access staircase system incorporating a railing system in accordance with an embodiment of the present invention.

The staircase system 10 may form a flush surface with the ceiling 22. The staircase system 10 may also be recessed into the ceiling 22. The staircase system 10 may also be manually released, stowed, and deployed or may be automated, as is described in further detail below. The staircase system 10 may include release mechanisms or elements 90, which may be manually rotated or rotated via associated actuators 92. When the staircase system 10 is manually deployed a deployment handle or "pull-down" rope, such as rope 94, may be incorporated and dropped down upon opening of the access door 30. The pull down rope 94 may be coupled to the staircase system 10 in various locations. The staircase system 10 may be electrically, pneumatically, or hydraulically actuated, examples of which are shown in FIGS. 2–4.

Figure 2:
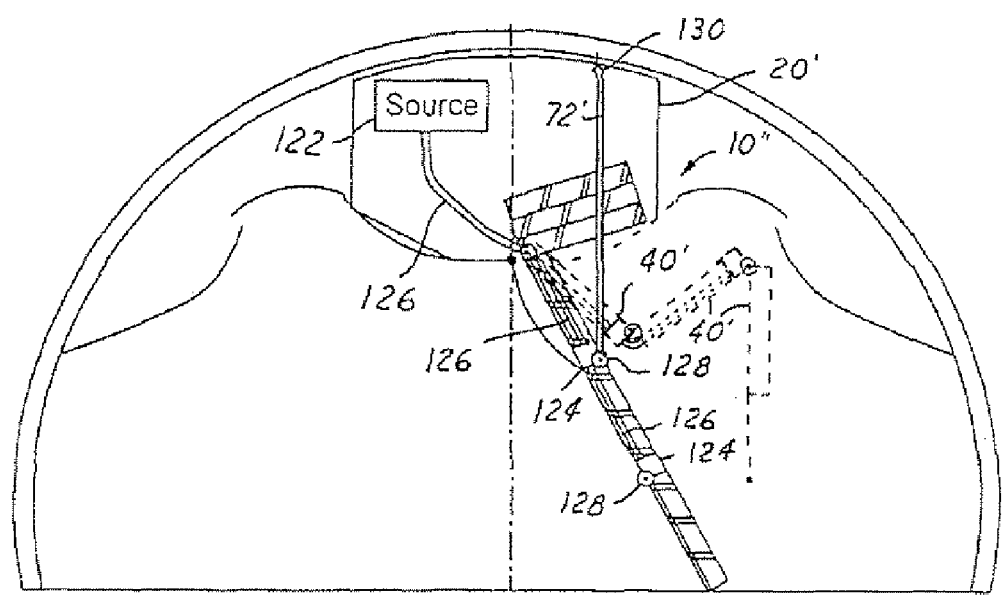
FIG. 2 is a side view of an overhead area access staircase system incorporating electrically or pneumatically assisted stair segments in accordance with multiple embodiments of the present invention.

Referring now to FIG. 2, a side view of a third overhead area access staircase system 10" incorporating electrically or pneumatically assisted stair segments 40" in accordance with multiple embodiments of the present invention is shown. The stair segments 40" include a stair actuating system 120, which includes a source 122, motors 124, and lines 126 for stowage and deployment of the stair segments 40".

When the staircase system 10" is electrically actuated the motors 124 are in the form of electrical motors that receive power from the source 122 via the lines 126. For this electrical example embodiment, the lines are electrical power lines. The motors 124 are coupled to gears 128, which when actuated rotate the stair segments 40" relative to each other. The source 122 is an electrical power source.

When the staircase system 10" is pneumatically operated, the motors 124 are in the form of pumps that pump air from the source 122 through the lines 126 to rotate the stair segments 40". For this pneumatic example embodiment, the lines 126 are air lines. The source 122 for this sample embodiment may be in the form of an air tank.

A lanyard 72" is shown as being indirectly coupled to the overhead module 20". The lanyard 72" is coupled to an eyebolt 130, which in turn is fastened to the overhead module 20" and/or the structure 74.

Referring now to FIG. 3, a side view of a forth overhead area access staircase system 10"' incorporating hydraulically assisted stair segments 40"' in accordance with another embodiment of the present invention is shown. The staircase system 10"' is similar to the system 10" except that it includes hydraulic drives 140. The hydraulic drives 140 pump liquid to and from the source 122" in actuating the stair segments 40"". A first hydraulic drive 142 is coupled to a first stair segment 144 and to a first flexible arched line 146, which is coupled to a second stair segment 148. A second hydraulic drive 150 is coupled to the second stair segment 148 and to a second flexible arched line 152, which is coupled to a third stair segment 154. The arched lines 146 and 152 allow the stair segments 40"" to fold onto each other when stowed.

Referring now to FIG. 4, a side view of a fifth overhead area access staircase system 10""" incorporating a railing system 160 in accordance with an embodiment of the present invention is shown. The railing system 160 includes multiple handrails or rail members 162, which are coupled to the stair segments 40""" via the balusters 164. The railing system 160 also includes a rail-actuating system 166 that is used to stow and deploy the rail members 162. For clarity of FIG. 4, the rail members 162, the balusters 164, and the actuation system 166 are just shown on the deployed representation of the staircase system 10""".

The rail members 162 extend a substantial length of the stair segments 40""" and aid in ascending and descending the stair segments 40""". The rail members 162 may couple to each other when deployed or have associated bridge elements, such as element 170. Although the rail members 162 are shown as being coupled to just the upper stair segments 172, they may be coupled to the lower stair segment 174. Any number of rail elements may be utilized. The rail members 162 as well as the balusters 164 may also be formed of various lightweight materials, such as aluminum, steel, wood, a composite material, or a combination thereof.

The balusters 164 may be in the form of potential energy devices. The balusters 164 may, for example, include springs (not shown) and may be biased to aid in the stowage and/or deployment of the rail members 162. A few examples of balusters are shown in FIGS. 5–6.

The rail actuation system 160 may include various components and devices for stowing and deploying the rail members 162. The rail actuation system 160 may include various rail-actuating elements, such as linkages, gears, telescoping elements, pulleys, cables, pins, hinges, or other elements known in the art for actuation of the rail members 162 and balusters 164. Also, the rail actuation system 160 may include electrical, pneumatic, or hydraulic control, similar to that provided above for actuating the stair segments 40" and 40"" with respect to the embodiments of FIGS. 2 and 3. Some example rail actuation systems 160 are shown in FIGS. 5–6.

Figure 5:
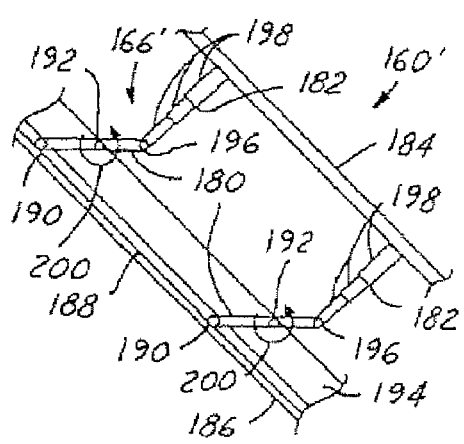
FIG. 5 is a side view of a railing system incorporating linkages and telescoping balusters in accordance with an embodiment of the present invention.
Figure 6:
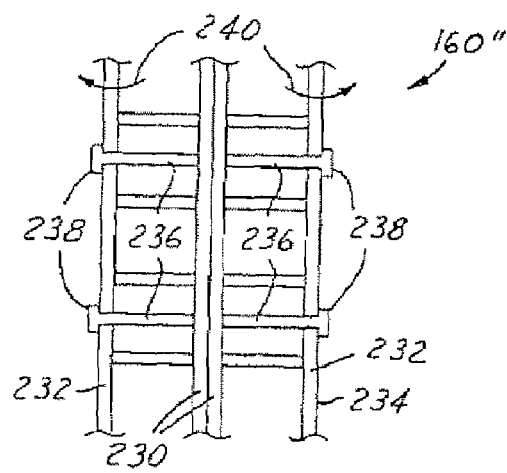
FIG. 6 is a front view of a railing system incorporating hinged balusters in accordance with another embodiment of the present invention.

Referring now to FIG. 5, a side view of a sample railing system 160" incorporating linkages 180 and telescoping balusters 182 in accordance with an embodiment of the present invention is shown. The railing system 160" includes a rail member 184 that is coupled to a stair segment 186 via a rail-actuating system 166". The rail-actuating system 166" includes the linkages 180 and balusters 182. The linkages 180 are coupled to an actuation bar 188 via a first set of pivot joints 190. The linkages 180 rotate on a second set of pivot joints 192, which are coupled to the support members 194 (only one is shown) of the stair segment 186. The balusters 182 are coupled to the linkages 180 via a third set of pivot joints 196.

As the bar 188 is actuated the linkages 180 are rotated on the second set of pivot joints 192 to either stow the rail member 184 against the stair segment 186 or to deploy the rail member 184 away from and parallel to the stair segment 186. The balusters 182, by having telescoping capability, provide additional separation distance between the rail member 184 and the stair segment 186. The telescoping elements 198 of the balusters 182 may lock to each other when deployed to stabilize the rail member 184.

The rail member 184 may be simultaneously deployed with the stair segment 186 through actuation of the bar 188. For example, as the stair segment 186 is deployed the bar 188 may come in contact with and/or be translated due to the rotation of an adjacent stair segment. The translation of the bar 188 rotates the linkages 180 in a counter clockwise direction, as depicted by arrows 200, to deploy the rail member 184. The rail element 184 may then be "pulled out" or away from the stair segment 186 to extend the balusters 182.

Referring now to FIG. 6, a front view of a railing system 160"" incorporating hinged rail elements in accordance with another embodiment of the present invention is shown. The rail members 230 are coupled to the support members 232 of the stair segment 234 via baluster 236 and hinges 238. The rail members 230 are manually deployed by rotation of the rail members 230 relative to the support members 232 on the hinges 238, as depicted by arrows 240.

The present invention provides several staircase systems that can be conveniently stowed in a compact arrangement within an overhead area. The present invention may be applied in various applications and provides efficient use of space and increased storage ability.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An overhead area access staircase system for an aircraft comprising:
   an aircraft overhead module;
   a plurality of stair segments that are rotatably actuated relative to each other when deployed and are configured to be in proximity with said aircraft overhead module, at least one of said stair segments contacting said aircraft overhead module when deployed, said stair segments comprising;
   a plurality of step elements; and
   a plurality of support members coupled to said plurality of step elements; and
   an actuating system coupled to and altering an orientation of said plurality of stair segments, said actuating system is actuated using at least one operating technique selected from electrically operated via a plurality of electrical motors coupled to each of said plurality of stair segments, hydraulically operated, and pneumatically operated.

2. A system as in claim 1 wherein at least one of said plurality of stair segments is coupled to a lining of said aircraft overhead module.

3. A system as in claim 1 wherein said plurality of stair segments are configured to fold onto each other when stowed.

4. A system as in claim 1 wherein said plurality of stair segments comprises:
   a first stair segment;
   a second stair segment coupled to said first stair segment to rotate in a first direction relative to said first stair segment when deployed; and a third stair segment coupled to said second stair segment to rotate in a second direction relative to said second stair segment when deployed.

5. A system as in claim 4 wherein said first direction is opposite that of said second direction.

6. A system as in claim 1 wherein at least one of said plurality of stair segments is a non-railing segment.

7. A system as in claim 1 further comprising at least one potential energy device coupled to and assisting stowage of said plurality of stair segments.

8. A system as in claim 1 further comprising at least one potential energy device coupled to and assisting deployment of said plurality of stair segments.

9. A system as in claim 1 further comprising a lanyard coupled to said plurality of stair segments.

10. A system as in claim 1 wherein said plurality of stair segments are deployable from at least one of said aircraft overhead module.

11. A system as in claim 1 further comprising at least one rail element coupled to said plurality of support members.

12. A system as in claim 11 wherein said at least one rail element comprises a plurality of rail members extending a substantial length of said plurality of stair segments.

13. A system as in claim 11 wherein said at least one rail element has a stowed state and a deployed state.

14. A system as in claim 11 wherein said at least one rail element comprises:
    a first rail member coupled to a first stair segment; and
    a second rail member coupled to a second stair segment.

15. A system as in claim 11 wherein said at least one rail element comprises:
    at least one rail member; and
    a plurality of rail actuating elements coupled to and deploying said plurality of railing members.

16. A system as in claim 11 wherein said at least one rail element is coupled to said plurality of support members such that said at least one rail member is actuated into a deployed state when said plurality of stair segments are deployed.

17. A system as in claim 16 wherein said at least one rail member is translated away from and maintains a parallel orientation with said plurality of stair segments when deployed.

18. A system as in claim 11 wherein said at least one rail element is coupled to and translated relative to said plurality of stair segments via a plurality of linkages.

19. A system as in claim 11 wherein said at least one rail member is coupled to at least one hinge and rotates relative to said plurality of stair segments.

20. A system as in claim 11 further comprising an actuating system coupled to and deploying said at least one rail member.

21. A system as in claim 20 wherein said actuating system is operated using at least one operating technique selected from electrically operated, hydraulically operated, and pneumatically operated.

22. A system as in claim 1 wherein said plurality of stair segments further comprise a plurality of guides coupled to said plurality of support members, said plurality of stair segments translatable relative to each other on said guides.

23. An aircraft comprising:
an aircraft overhead module; and
at least one overhead area access staircase system comprising;
    a plurality of stair segments that are rotatably actuated relative to each other when deployed and configured to be in proximity with said aircraft overhead module, at least one of said stair segments contacting said aircraft overhead module when deployed, said stair segments comprising;
    a plurality of step elements;
    a plurality of support members coupled to said plurality of step elements; and
    an actuating system coupled to and altering position of said plurality of stair segments via at least one operating technique selected from from hydraulically operated and pneumatically operated operated, and pneumatically operated.

24. An aircraft as in claim 23 wherein said at least one overhead area access staircase system comprises at least one rail element coupled to said plurality of stair segments.

25. An aircraft as in claim 23 wherein said plurality of stair segments are configured to fold onto each other when stowed.

26. An aircraft as in claim 23 wherein said plurality of stair segments comprises:
    a first stair segment;
    a second stair segment coupled to said first stair segment to rotate in a first direction relative to said first stair segment when deployed; and
    a third stair segment coupled to said second stair segment to rotate in a second direction relative to said second stair segment when deployed.

27. An aircraft as in claim 23 further comprising at least one rail element coupled to said plurality of support members.

28. An aircraft comprising:
An aircraft overhead module; and
at least one overhead area access staircase system comprising;
    a plurality of stair segments that are actuated relative to each other when deployed, folded onto each other when stowed, and configured to be in proximity with said aircraft overhead module, at least one of said stair segments contacting said aircraft overhead module when deployed, said stair segments comprising;
    a plurality of step elements;
    a plurality of support members coupled to said plurality of step elements; and
    a non-linkage based system coupled to and altering the position of said plurality of stair segments via at least one operating technique selected from electrically operated, hydraulically operated and pneumatically operated.

* * * * *